June 22, 1965
M. CALTHORPE
3,190,689
COLLAPSIBLE ROOF CONSTRUCTIONS
Filed March 5, 1963
3 Sheets-Sheet 3
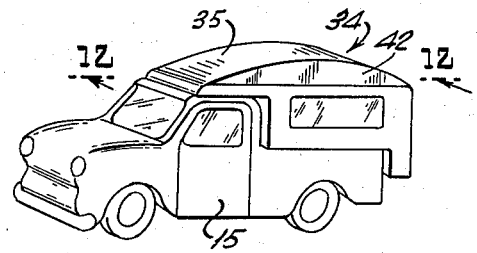
Fig.9.
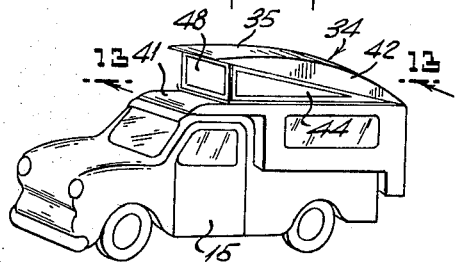
Fig.10.
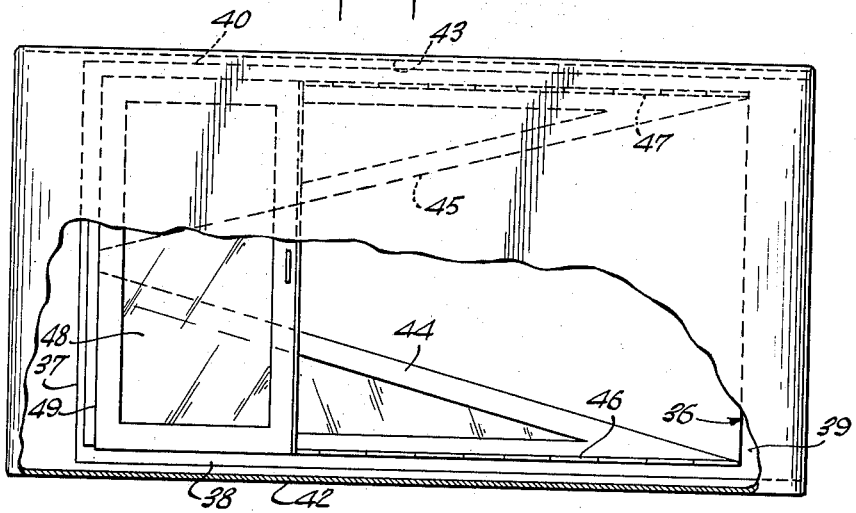
Fig.11.
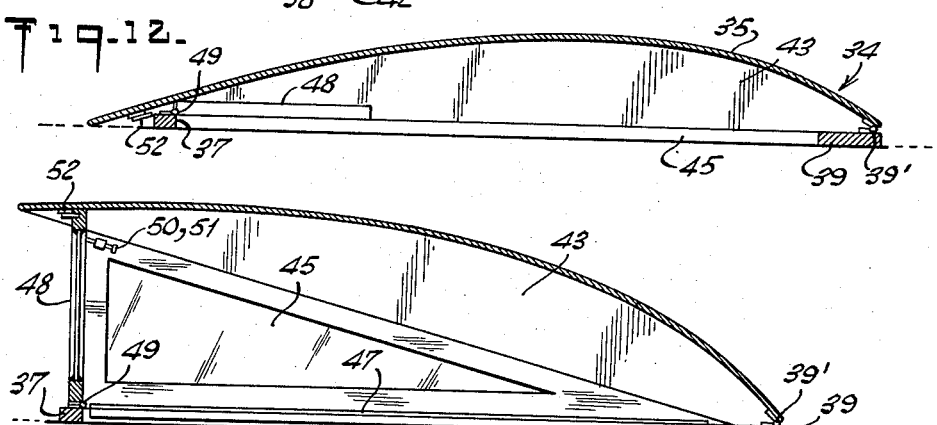
Fig.12.
Fig.13.
INVENTOR.
MAURICE CALTHORPE
BY
Nolte & Nolte
ATTORNEYS

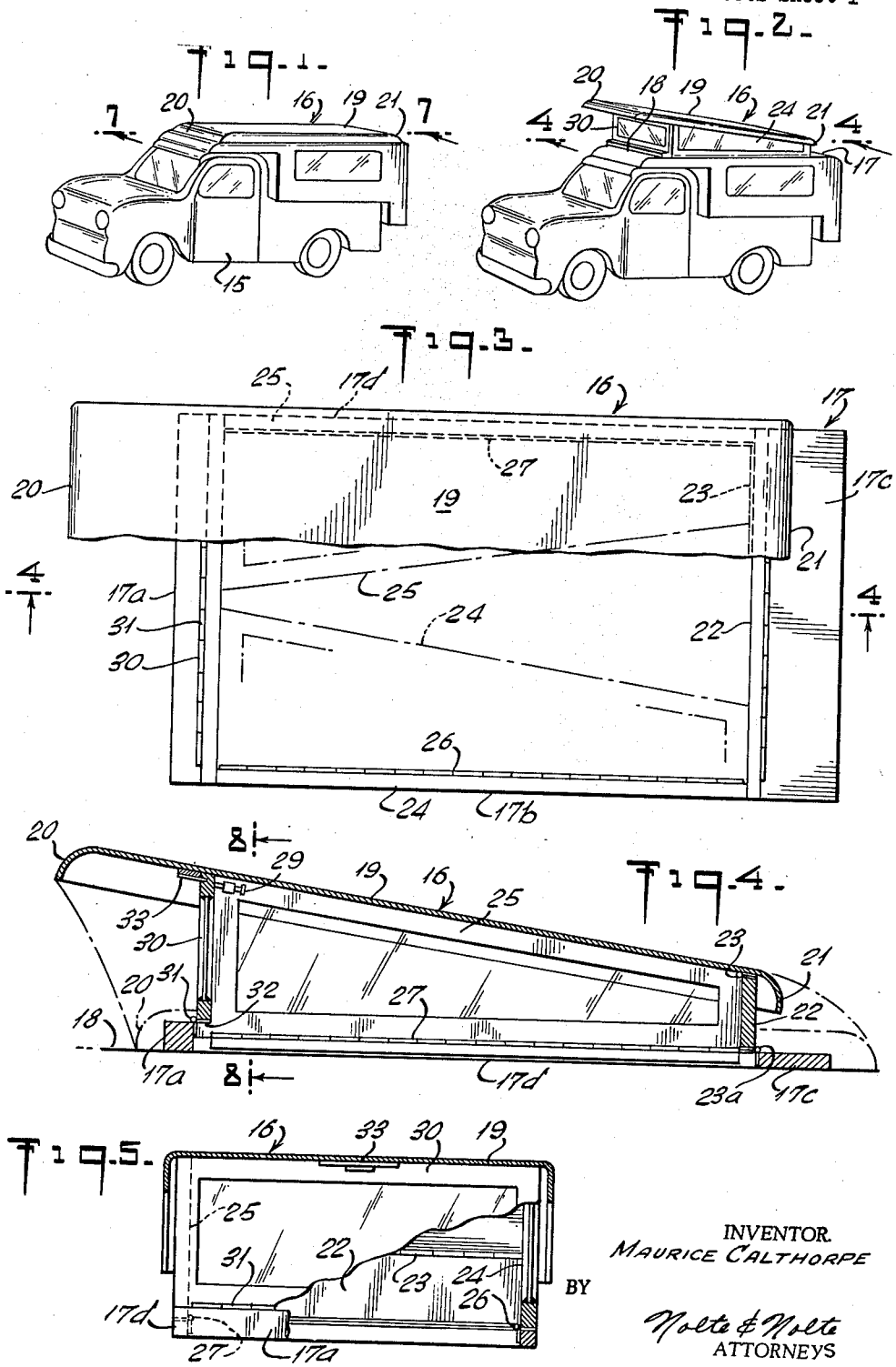

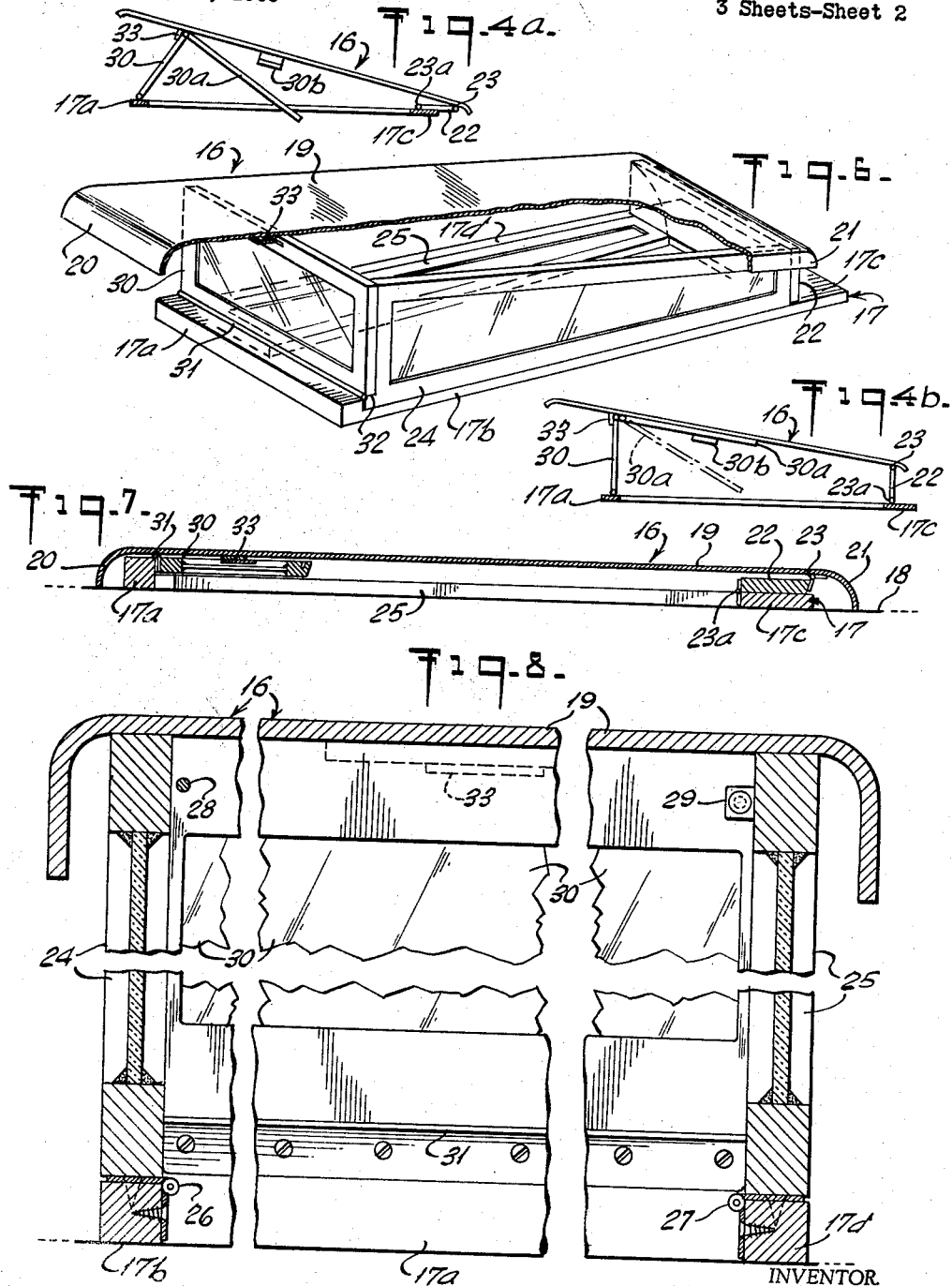

United States Patent Office 3,190,689
Patented June 22, 1965

3,190,689
COLLAPSIBLE ROOF CONSTRUCTIONS
Maurice Calthorpe, 14848 Manuella Ave.,
Los Altos Hills, Calif.
Filed Mar. 5, 1963, Ser. No. 262,868
6 Claims. (Cl. 296—137)

This invention relates to a roof construction for automotive vehicles. More particularly, it relates to a collapsible roof which can be readily attached to the top of a vehicle to provide more head room or space in the vehicle.

In many types of vehicles, such as station wagons, pick up trucks converted to campers, camping wagons or travel trailers, delivery or pick up wagons, vehicles where they carry groceries, foods, delicacies, ice cream and the like, and in many instances open motor boats or cruisers, it is desirable to add to the vehicle an expandable top or roof construction which becomes part of the vehicle to provide more space whether for head room as a work area, or as storage, sleeping or resting areas.

In accordance with my invention, it is an object thereof to provide a collapsible, readily expandable, assemblable roof construction for an automotive vehicle and the like.

Another object of my invention is to provide a roof construction for automotive vehicles, having a multiplicity of movable, hingedly connected panel parts, and which can be readily attached to an automotive vehicle.

A still further object of the present invention is to provide a collapsible roof construction for attachment to the top of a vehicle, and which permits viewing of the exterior therefrom.

A more specific object of the present invention is to provide a roof construction for attachment to the top of a vehicle, comprising a bottom frame, a roof top hingedly connected thereto, a plurality of lateral panels, and a front panel, and means for interconnecting the panels and roof top together onto the vehicle to form a part thereof and to increase the area in the vehicle.

Other objects and features of the present invention will become apparent from the following detailed description taken in conjunction with the accompanying drawings, in which:

FIG. 1 is a perspective view of a utility or station wagon showing the embodiment of my invention in collapsed condition forming a part thereof;

FIG. 2 is another perspective view of the station wagon with the embodiment in open or expanded condition;

FIG. 3 is a partly broken away plan view of the embodiment in open position;

FIG. 4 is a longitudinal sectional view showing the embodiment in expanded or opened condition and taken on line 4—4 of FIGS. 2 and 3;

FIGS. 4a and 4b are schematic showings of a contemplated mode of opening and roof structure of the invention.

FIG. 5 is a partly broken away front view of FIG. 4;

FIG. 6 is a partly broken away perspective view of the embodiment showing a portion thereof in collapsed condition;

FIG. 7 is a sectional view of the embodiment taken on line 7—7 of FIG. 1;

FIG. 8 is a broken away, sectional view taken on line 8—8 of FIG. 4;

FIG. 9 is a perspective view of a modification of the preferred embodiment of the invention in collapsed condition;

FIG. 10 is a perspective view of the embodiment shown in FIG. 9, in open or expanded condition;

FIG. 11 is a partly broken away plan view of the modification in collapsed condition;

FIG. 12 is a sectional view taken on line 12—12 of FIG. 9; and

FIG. 13 is a sectional view taken on line 13—13 of FIG. 10.

Referring now specifically to the drawings wherein like numerals refer to like parts thereon, there is provided an automotive vehicle, in the present instance a utility truck or wagon 15 of the usual type. On the roof of such wagon there is mounted in any suitable manner, a roof construction unit 16. Said wagon has its roof open or sufficiently cut away so that unit 16 will fit thereon and when opened will provide the desired amount of headroom or additional space for facilitating proper movement in the wagon. As shown in FIGS. 2 to 8 of the drawing, the unit has a base or lower frame 17 consisting of interconnecting base or frame members 17a, 17b, 17c and 17d, respectively. The base is of any suitable size, the front and rear members 17a and 17c being wider than members 17b and 17d to provide an area adapted to be coextensive with the opening in the top of the wagon. Furthermore, the base may be coextensive with the sides or edges of the roof 18 forming the opening to be covered by the roof construction or unit 16. Once this construction has been attached to the wagon in any suitable manner, it forms a permanent part thereof, although if desired such unit can be removed.

Said base members, 17a, 17b, 17c and 17d are each provided with connecting means for pivotally retaining side, front and rear movable panels. Roof top 19 of unit 16 is so made as to have forward and rear contoured or downwardly curved portions 20 and 21, respectively, and depending side walls so that when the unit is collapsed the roof top will be symmetrical with the rest of the roof of the vehicle. Said contoured or curved portions 20 and 21, respectively, are adapted to extend over the base or flooring 17 thereby covering the same when the roof top 19 is collapsed so as to provide the desired symmetry to the top of the wagon.

Side panels 24 and 25 are provided with windows or transparent members to permit visual observation from the interior of the vehicle. Said panels are connected to the base members 17b and 17d, respectively, by means of hinges 26 and 27, respectively. It is to be noted that said hinges 26 and 27 extend the full length of the connection, between the panels and the base members so as to facilitate smooth movement of the panels on the hinges as a pivot.

The respective panels are each provided with interiorly disposed spring locking means 28 and 29 to engage front panel 30 at either end thereof. Said panel 30 is also provided with a window and is connected at its bottom front 32 with forward base member 17a by means of a hinge 31 coextensive with the length of the panel. The rear panel 22 is hinged at its top to the underside of the roof 19 by a hinge 23 and at its bottom to the base member 17c by a hinge 23a.

A stop member 33 is provided at the under portion of the forward end of roof top 19 to engage the upper front of panel 30 and to limit the outward circular movement of panel 30 once the unit has been assembled.

After unit 16 has been attached to the top 18 of wagon 15, it may be expanded to provide the additional headroom or space.

In adjusting the component parts of the unit, the following procedure is used. Roof 19 which is rigid is pushed upwardly at its forward end, so that it will swing at an incline on the rear top hinges 23 of rear panel 22 which is also moved forwardly and upwardly on its lower hinge 23a, after it has been upwardly sprung as shown in FIG. 4. When roof 19 has reached the desired height and the rear panel 22 is vertical, forward panel 30 is moved upwardly on its hinge 31 so that the panel is vertical with respect to the base 17a and is then locked in position against stop member 33. After this, side panels 24 and 25 are swung outwardly on their respective hinges so as to assume a vertical position whereupon they are locked against the front panel 30 by means of locking members 28 and 29. Since rear panel 22 is double hinged it will be apparent that as the forward part of roof 19 is raised and pulled forward the panel will accordingly rise, in a circular manner around the hinged lower portion. The roof top will be at an incline as shown in FIGS. 2 and 4 because of the greater height of forward panel 30.

The locking members 28 and 29 each include a well known simple structure according to which a spring pressed pin is guided in a suitable housing and these pins are urged forward into openings located in the upper part of the front panel 30 when the latter is in its raised position shown in FIG. 4, for example. The spring-pressed pins have rear knobs so that they can conveniently be grasped by the operator to be retracted, and the springs are situated in suitable housings which are respectively fixed to the side panels. The springs engage and are situated behind flanges which project from the pins so that the springs urge the latter forwardly. The structural details of the spring-pressed locking members 28 and 29 form no part of the present invention.

In an alternative mode of adjusting the component parts, the roof 19 is pushed upward and the front panel 30 is pushed outward and forward on its hinge 31 until abutting against the stop member 33. At this point the rear panel 22 is still laying flat or partly erect as shown in FIG. 4a. A handle or arm 30a is attached to the top of the front panel 30, and by the aid of this arm the front panel is then pushed forward and upward about the hinge 31, and the front panel by abutting against the stop member 33 carries the roof also forward. The further forward movement of the roof results in the rear panel becoming erect about its hinges 23 and 23a, as shown in FIG. 4b. After the erection of the structure is complete, the handle or arm 30a may be clipped to the underside of the roof by a clip 30b, as shown in FIG. 4b in solid lines.

A roof construction of the type hereinabove described is flat so as to become a symmetrical part of the roof of the vehicle as shown. It will be further noted that the parts can be readily collapsed when it is not necessary to use the unit construction for additional headroom.

With respect to the embodiment illustrated in FIGS. 9 to 13, inclusive, the roof construction or unit 34 is provided with a curved roof top 35 as shown. The curved or beveled roof top 35 is mounted on a base 36 of any suitable opening size, which base being adaptable for attachment to the open roof of the vehicle. Said base contains interconnecting base members 37, 38, 39 and 40, respectively, and is suitable for mounting onto the roof 41 of wagon 15. In the alternative said base may be of one piece. Said roof top 35 is connected at its rear end to base member 39 by means of a hinge 39′ which extends the full width of the roof top of said end. It will be noted that the roof top has depending side walls 42 and 43 to provide coverage and symmetrical appearance to the top of the wagon when the roof top is brought down toward roof 41 of the wagon.

Said unit 34 is further provided with side window panels 44 and 45 respectively which are attached to the base members 38 and 40, respectively, by means of lateral hinges 46 and 47, respectively.

With respect to the lateral hinged panels 44 and 45 the same may be of triangular shape or outline as shown so as to conform with the sides of the roof top when the same is raised as shown in FIG. 10. The roof construction 34 furthermore is provided with a front window panel 48 which extends across the front part of the construction. Said window panel 48 is connected to the base member 37 by means of a hinge 49. Said panels 44, 45 and 48 are swung outwardly to support said top 35 in raised position, and inwardly of the respective hinges when in collapsed position.

In order to keep said panels in raised vertical position there are provided locking members 50 and 51 identical with the lock members 28 and 29 referred to above. Said roof top 35 is provided with a stop member 52 at the forward end thereof in order to provide a stop for window panel 48.

In order to assemble the construction in the manner as shown in FIG. 10 whereby the roof is raised, said roof section 35 is pushed upwardly at its forward portion, from the interior of the vehicle so that said roof extends upwardly around its hinge 39′, whereupon the side panels 44 and 45 are swung upwardly and outwardly on their respective hinges after the forward panel is raised as shown in FIG. 13 against stop member 52 and then all panels are held together by means of the locking members 50 and 51, respectively.

From the foregoing, it will be noted that there is provided a novel type of roof construction which can be readily attached to the top of an automotive vehicle and which can be collapsed or expanded into open position as the case may be, depending upon the desires of the owner of the vehicle. Furthermore, the roof constructions as illustrated and described herein are made in such a manner as to become symmetrically a part of the vehicle on to which it is attached. This type of construction is highly useful in automotive vehicles of various types, depending upon where additional headroom is desired. This unit furthermore can be used for many purposes in a vehicle. Extra headroom in the vehicle is used as desired for storage, sleeping quarters, or for refrigeration while at the same time providing protection against inclement weather.

A roof construction made according to the present invention may be made of any suitable material, such as plastic molded material, forged metal plating, or wood.

While preferred embodiments of the invention have been described and illustrated, it will be noted that various modifications as to arrangement of parts and use of materials may be made without departing from the spirit and scope of the invention as claimed.

I claim:

1. A collapsible roof construction for a vehicle to provide more headroom therein, comprising a base frame adapted to be attached to the vehicle, said base frame including a rear frame member extending transversely across the vehicle and having front and rear edges, a roof top located over said base frame, and means connecting said roof top to said base frame for movement relative thereto between a lower collapsed position where said roof top is closely adjacent to said frame and an upper expanded position where said roof top is situated over said frame at a greater distance therefrom than when said roof top is in said collapsed position, said connecting means also connecting said roof top to said base frame for longitudinal movement relative thereto, when said roof top is moved between said collapsed and expanded positions thereof, so that said roof top in its expanded position is longitudinally displaced with respect to said base frame as compared to the position which said roof top has with respect to said base frame when said roof top is in its collapsed position, said connecting means including a rear arcuately movable panel hingedly connected at the bottom thereof to the base frame and hingedly connected at its upper end to the roof top, said rear panel being hingedly connected at said bottom thereof to said rear frame member adjacent said front edge thereof.

2. A construction as set forth in claim 1, wherein the roof top has overhanging depending side walls and front and rear portions.

3. A roof construction as set forth in claim 1 wherein the rear panel is hingedly connected transversely to one end of the base frame at the bottom thereof and hingedly and transversely connected to the roof member at the top portion thereof but short of the rear end of the roof top.

4. A roof construction as set forth in claim 1 wherein the rear panel swings outwardly of its hinged connection relative to the base frame and is adapted to swing in the form of an arc while simultaneously raising and longitudinally displacing the roof top, and said connecting means also including a front panel of greater height than the rear panel to impart an inclined attitude to the roof top.

5. A roof construction as set forth in claim 1 wherein said connecting means includes lateral hinged panels hinged to said base frame and adapted to merge with the roof top, a front panel, and means for conjointly interlocking the front and lateral panels with respect to the roof top.

6. A collapsible roof construction for a vehicle, comprising a substantially rectangular base frame including four frame members respectively arranged along the sides of a rectangle and including a relatively wide rear frame member having front and rear edges, a roof top, and means connected to said roof top and frame for displacing said roof top between a raised position spaced above said frame and a collapsed position, said means including a rear panel having a lower edge hinged to said front edge of said rear frame member and having a collapsed position located over and lying against said rear frame member, and said roof top in its a collapsed position being located over and closely adjacent said frame, said roof top having a rear portion hinged to an upper edge of said rear panel and said roof top when raised from said frame turning said rear panel from a lower position located against said rear frame member to a substantially vertical position extending upwardly from said frame and raising the rear portion of said roof top while displacing said rear portion of said roof top forwardly with respect to said frame.

References Cited by the Examiner
UNITED STATES PATENTS

| | | | |
|---|---|---|---|
| 2,926,042 | 2/60 | Calthrope | 296—137 |
| 2,984,515 | 5/61 | Hocks | 296—23 |
| 3,061,359 | 10/62 | Pearlman | 296—26 |

FOREIGN PATENTS

| | | |
|---|---|---|
| 83,658 | 12/56 | Netherlands. |
| 100,293 | 2/37 | Australia. |
| 845,211 | 5/39 | France. |
| 1,125,937 | 7/56 | France. |

MILTON BUCHLER, *Primary Examiner.*

A. HARRY LEVY, *Examiner.*